US010817182B2

(12) United States Patent
Benisty

(10) Patent No.: US 10,817,182 B2
(45) Date of Patent: Oct. 27, 2020

(54) SYSTEM AND METHOD FOR ADAPTIVE EARLY COMPLETION POSTING USING CONTROLLER MEMORY BUFFER

(71) Applicant: Western Digital Technologies, Inc., San Jose, CA (US)

(72) Inventor: Shay Benisty, Beer Sheva (IL)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/455,644

(22) Filed: Jun. 27, 2019

(65) Prior Publication Data

US 2019/0324659 A1   Oct. 24, 2019

Related U.S. Application Data

(60) Division of application No. 15/602,874, filed on May 23, 2017, now Pat. No. 10,452,278, which is a
(Continued)

(51) Int. Cl.
*G06F 3/06* (2006.01)
*G06F 13/16* (2006.01)
*G06F 13/20* (2006.01)

(52) U.S. Cl.
CPC .......... *G06F 3/0611* (2013.01); *G06F 3/0659* (2013.01); *G06F 3/0688* (2013.01); *G06F 13/1642* (2013.01); *G06F 13/20* (2013.01)

(58) Field of Classification Search
CPC .... G06F 3/0611; G06F 3/0659; G06F 3/0688; G06F 13/1642; G06F 13/20; G06F 13/1673; G06F 3/061; G06F 3/0679
See application file for complete search history.

(56) References Cited

U.S. PATENT DOCUMENTS 6,065,089 A    5/2000  Hickerson
6,654,343 B1  11/2003  Brandis
(Continued)

FOREIGN PATENT DOCUMENTS

EP         2312457      4/2011
JP       2008-046791    2/2008
(Continued)

OTHER PUBLICATIONS

"NVM Express™: Unlock the Potential," compilation of several articles from Forum A-11, 2014 Flash Memory Summit, Aug. 4-7, 2014, Santa Clara CA, 91 pages.
(Continued)

*Primary Examiner* — Francisco A Grullon
(74) *Attorney, Agent, or Firm* — Morgan, Lewis & Bockius LLP

(57) ABSTRACT

Systems and methods for dynamic and adaptive interrupt coalescing are disclosed. NVM Express (NVMe) implements a paired submission queue and completion queue mechanism, with host software on the host device placing commands into the submission queue. The memory device notifies the host device, via an interrupt, of entries on the completion queue. Responsive to receiving the interrupt, the host device access the completion queue to access entries placed by the memory device therein. The host device may take a certain amount of time to service the interrupt resulting in host latency. Given knowledge of the host latency, the memory device time the sending of the interrupt so that, given the host latency, the memory device may post the entry to the completion queue in a timely manner.

6 Claims, 13 Drawing Sheets

Related U.S. Application Data continuation-in-part of application No. 15/468,620, filed on Mar. 24, 2017, now Pat. No. 10,466,903.

(56) References Cited

U.S. PATENT DOCUMENTS

| | | |
|---|---|---|
| 7,386,674 B1 | 6/2008 | Lango |
| 8,554,968 B1 | 10/2013 | Onufryk |
| 8,732,406 B1 | 5/2014 | Pase |
| 9,317,204 B2 | 4/2016 | Hahn |
| 9,680,931 B1* | 6/2017 | Karnowski ............. G06F 3/067 |
| 9,817,761 B2 | 11/2017 | Ben-Shemesh |
| 9,927,983 B2 | 3/2018 | Benisty |
| 10,095,442 B2 | 10/2018 | Myouga |
| 2003/0204552 A1 | 10/2003 | Zuberi |
| 2004/0199732 A1 | 10/2004 | Kelley |
| 2005/0195635 A1 | 9/2005 | Conley et al. |
| 2006/0161733 A1 | 7/2006 | Beckett et al. |
| 2008/0109573 A1 | 5/2008 | Leonard |
| 2010/0274940 A1* | 10/2010 | Ahmad ................. G06F 3/0659 710/267 |
| 2012/0151472 A1 | 6/2012 | Koch et al. |
| 2014/0181323 A1 | 6/2014 | Manula |
| 2014/0189212 A1 | 7/2014 | Slaight |
| 2014/0281040 A1 | 9/2014 | Liu |
| 2015/0019798 A1 | 1/2015 | Huang |
| 2015/0067291 A1 | 3/2015 | Miyamoto |
| 2015/0074338 A1 | 3/2015 | Raviv et al. |
| 2015/0074677 A1 | 3/2015 | Pream |
| 2015/0081933 A1 | 3/2015 | Vucinic et al. |
| 2015/0127882 A1 | 5/2015 | Carlson et al. |
| 2015/0177994 A1 | 6/2015 | Vucinic |
| 2015/0178017 A1 | 6/2015 | Darrington |
| 2015/0186068 A1 | 7/2015 | Benisty |
| 2015/0186074 A1 | 7/2015 | Benisty |
| 2015/0254088 A1 | 9/2015 | Chou et al. |
| 2015/0363229 A1 | 12/2015 | Wang |
| 2016/0004438 A1 | 1/2016 | Moon et al. |
| 2016/0026388 A1 | 1/2016 | Jeong et al. |
| 2016/0062669 A1 | 3/2016 | Chu |
| 2016/0077740 A1 | 3/2016 | Hussain et al. |
| 2016/0085718 A1 | 3/2016 | Huang |
| 2016/0124876 A1 | 5/2016 | Vucinic |
| 2016/0140041 A1 | 5/2016 | Niu et al. |
| 2016/0147442 A1 | 5/2016 | Baderdinni et al. |
| 2016/0162219 A1 | 6/2016 | Erez |
| 2016/0188510 A1 | 6/2016 | Singh et al. |
| 2016/0216905 A1 | 7/2016 | Yazdani et al. |
| 2016/0239939 A1 | 8/2016 | Kakarlapudi |
| 2016/0267016 A1 | 9/2016 | Lee et al. |
| 2016/0291866 A1 | 10/2016 | Olkay |
| 2016/0292007 A1 | 10/2016 | Ding et al. |
| 2016/0321010 A1 | 11/2016 | Hashimoto |
| 2016/0321012 A1 | 11/2016 | Clark et al. |
| 2016/0342545 A1 | 11/2016 | Arai |
| 2017/0010992 A1 | 1/2017 | Sarconc et al. |
| 2017/0060422 A1 | 3/2017 | Sharifie et al. |
| 2017/0060749 A1 | 3/2017 | Segev et al. |
| 2017/0075629 A1 | 3/2017 | Manohar et al. |
| 2017/0075828 A1 | 3/2017 | Monji et al. |
| 2017/0075834 A1 | 3/2017 | Cha et al. |
| 2017/0083252 A1 | 3/2017 | Singh et al. |
| 2017/0090753 A1 | 3/2017 | Benisty |
| 2017/0109096 A1 | 4/2017 | Jean |
| 2017/0123659 A1 | 5/2017 | Nam et al. |
| 2017/0123667 A1 | 5/2017 | Richter |
| 2017/0131917 A1 | 5/2017 | Yun |
| 2017/0177222 A1 | 6/2017 | Singh et al. |
| 2017/0214762 A1 | 7/2017 | Swain |
| 2017/0286205 A1 | 10/2017 | Jeong |
| 2017/0322897 A1 | 11/2017 | Benisty et al. |
| 2017/0336988 A1* | 11/2017 | Kim ..................... G06F 3/0685 |
| 2018/0059987 A1 | 3/2018 | Nimmagadda |
| 2018/0095911 A1 | 4/2018 | Ballapuram |
| 2018/0113615 A1 | 4/2018 | Park |
| 2018/0173461 A1 | 6/2018 | Carroll |
| 2018/0217951 A1 | 8/2018 | Benisty |
| 2018/0260152 A1 | 9/2018 | Bar et al. |
| 2018/0275872 A1 | 9/2018 | Benisty |
| 2018/0275921 A1 | 9/2018 | Katagiri |
| 2018/0285073 A1 | 10/2018 | Fukuchi |
| 2018/0314421 A1 | 11/2018 | Linkovsky et al. |
| 2018/0321844 A1 | 11/2018 | Benisty |
| 2018/0321945 A1 | 11/2018 | Benisty |
| 2018/0321987 A1 | 11/2018 | Benisty |
| 2018/0341410 A1 | 11/2018 | Benisty |
| 2019/0018805 A1 | 1/2019 | Benisty |

FOREIGN PATENT DOCUMENTS

| | | |
|---|---|---|
| KR | 20110110106 | 10/2011 |
| KR | 20160060119 | 5/2016 |
| KR | 2017-0032502 | 3/2017 |

OTHER PUBLICATIONS

Ellefson, SSD Product Market Manager—PCIe, Micron Technology, NVM Express: Unlock Your Solid State Drives Potential, Flash Memory Summit, 2013, Santa Clara, CA, 114 pages.

Marks, Dell, Inc., "An NVM Express Tutorial," Flash Memory Summit 2013, Santa Clara, CA 92 pages.

NVMe Express Workgroup: "NVM Express 1.2," dated Nov. 3, 2014, downloaded on Aug. 9, 2018 from http://nvmexpress.org/wp-content/uploads/NVM_Exoress_1_2_Gold_20141209.pdf, 205 pages.

Advisory Action from U.S. Appl. No. 15/585,827, dated Apr. 10, 2019, 4 pages.

International Search Report and Written Opinion from PCT/2018/019905, dated May 4, 2018, 13 pages.

International Search Report and Written Opinion from PCT/2018/019909, dated Jul. 6, 2018, 13 pages.

International Search Report and Written Opinion from PCT/2018/019911, dated May 22, 2018, 15 pages.

International Search Report and Written Opinion from PCT/2018/019914, dated Jul. 13, 2018, 18 pages.

International Search Report and Written Opinion from PCT/2018/019930, dated Jun. 4, 2018, 16 pages.

International Search Report and Written Opinion from PCT/2018/019933, dated May 22, 2018, 12 pages.

International Search Report and Written Opinion from PCT/2018/019941, dated Jul. 13, 2018, 18 pages.

Office Action from U.S. Appl. No. 15/497,547, dated Jan. 4, 2019, 23 pages.

Office Action from U.S. Appl. No. 15/585,717, dated Jun. 26, 2018, 10 pages.

Office Action from U.S. Appl. No. 15/585,717, dated Mar. 18, 2019, 13 pages.

Office Action from U.S. Appl. No. 15/585,753, dated Nov. 23, 2018, 11 pages.

Office Action from U.S. Appl. No. 15/585,827, dated Dec. 19, 2018, 31 pages.

Office Action from U.S. Appl. No. 15/585,827, dated Jun. 26, 2018, 36 pages.

Office Action from U.S. Appl. No. 15/602,874, dated Jan. 28, 2019, 19 pages.

Office Action from U.S. Appl. No. 15/613,795, dated Apr. 3, 2019, 11 pages.

Office Action from U.S. Appl. No. 15/651,544, dated Oct. 17, 2018, 13 pages.

Korean Notice of Allowance dated Aug. 6, 2020 from Korean Patent Application No. 2019-7016854, 2 pages including English language translation.

* cited by examiner

US 10,817,182 B2

SYSTEM AND METHOD FOR ADAPTIVE EARLY COMPLETION POSTING USING CONTROLLER MEMORY BUFFER

CROSS REFERENCE TO RELATED APPLICATIONS

This application is a divisional application of U.S. application Ser. No. 15/602,874, entitled "SYSTEM AND METHOD FOR ADAPTIVE EARLY COMPLETION POSTING USING CONTROLLER MEMORY BUFFER," filed on May 23, 2017, which is a continuation-in-part of U.S. application Ser. No. 15/468,620, entitled "SYSTEM AND METHOD FOR DYNAMIC AND ADAPTIVE INTERRUPT COALESCING," filed on Mar. 24, 2017, the entirety of which is incorporated herein by reference.

BACKGROUND

NVM Express (NVMe) is a standard for accessing non-volatile storage media attached via PCI Express (PCIe) bus. NVMe may be used with a variety of non-volatile storage media, such as solid state drives (SSDs). One focus of NVMe relates to I/O communication between a host device (which may access and/or write to the non-volatile storage media) and a memory device (which includes the non-volatile storage media). In that regard, NVMe implements a paired submission queue and completion queue mechanism, with host software on the host device placing commands into the submission queue. Completions are placed onto the associated completion queue by the memory device controller.

BRIEF DESCRIPTION OF THE DRAWINGS

The accompanying drawings, which are incorporated in and constitute a part of this specification, illustrate various aspects of the invention and together with the description, serve to explain its principles. Wherever convenient, the same reference numbers will be used throughout the drawings to refer to the same or like elements.

DETAILED DESCRIPTION OF EMBODIMENTS

Overview

Figure 1A:
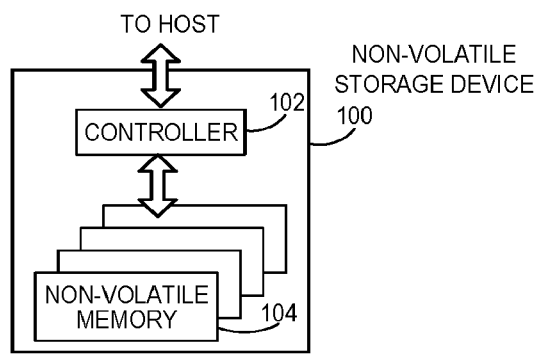
FIG. 1A is a block diagram of an exemplary non-volatile memory system.

NVM Express is based on a paired submission queue and completion queue mechanism. As discussed in more detail below with regard to FIG. 3, the NVMe standard includes a sequence of steps for processing a command. For example, the sequence may be as follows: the host device posting a host command to a submission queue; the host device sending a notice to the memory device that the host command is posted to the submission queue; the memory device fetching the host command from the submission queue; the memory device executing the host command; the memory device posting an entry to the completion queue indicative that the host command has completed execution (e.g., the entry on the completion queue is indicative that the status of execution of the command is completed); the memory device sending a notice to the host device that an entry is posted to the completion queue; the host device retrieving the entry from the completion queue; and the host device sending a notice that the entry has been retrieved from the completion queue.

In this regard, commands are placed by host software of the host device into a submission queue. Completions are placed into the associated completion queue by the controller of the memory device. Thus, the completion queue is a queue that is indicative of execution of commands. In one implementation, submission queues and completion queues are allocated in host memory on the host device. In particular, each submission queue and completion queue may be physically located contiguously in the host memory or non-contiguously in the host memory. Alternatively, the host device may place the submission queue and the completion queue in the Controller Memory Buffer (CMB) in controller memory of the memory device.

NVMe command execution performance is measured between the time the host device sends the notice to the memory device that the command is posted to the submission queue (e.g., the host device issues a doorbell write to a submission queue) and the host device sending the notice that the entry has been retrieved from the completion queue (e.g., the host device writing to the corresponding completion queue doorbell).

Thus, in processing the commands, the host device may request an action, such as reading an entry on the completion queue. As discussed above, the completion queue in one implementation is resident in the CMB on the memory device. In this implementation, the host device may request the reading of the completion queue in the CMB by using a transport packet layer (TLP) read request to read from the CMB in the memory device. In response to receipt of the TLP request, the memory device performs the action, such as reads the completion queue in the CMB, and sends the results of the action, such as the entry read from the completion queue in the CMB. Typically, the controller of the memory device will schedule to perform the action, such as reading the CMB, along with scheduling various other tasks to perform. In this regard, the scheduling of when the action is performed is based on a priority of performing the action responsive to the request and the priorities of the various other tasks. Thus, the memory device responds to the TLP request in a passive manner, simply responding to the TLP request based on the internal resources of the memory device.

In one implementation, the controller of the memory device may respond to the TLP request in an active manner, whereby the memory device reviews the content of the request, namely that the request seeks to read from the completion queue in the CMB, and determines whether to delay responding to the request based on other actions or anticipated future activity that may affect the completion queue (e.g., the memory device determining that the completion queue on the CMB will, in a certain number of hardware cycles, post another entry). In particular, the controller may monitor the interface between the host device and the memory device, such as the PCIe interface, in order to identify the TLP read request to the completion queue on the CMB. In this way, the controller of the memory device may actively monitor whether, based on the other actions affecting the completion queue, to delay responding to the request from the host device.

As one example, the memory device may have previously posted a first entry to the completion queue with the first entry indicative of completion of execution of a first command. Further, responsive to completing execution of the first command, the memory device may have sent an interrupt to the host device so that the host device accesses the first entry posted to the completion queue. Responsive to receiving the interrupt, the host device sends a request to access the completion queue. Responsive to receiving the request, the memory device may determine whether another command (such as a second command) will be completed, resulting in the updating of the completion queue within a predetermined time period of a second entry, with the second entry indicative of completion of execution of a first command. In this regard, the memory device may delay the response to the request to access the completion queue. As another example, the memory device may store therein a sequential queue, in which the host device causes commands to be placed for execution by the memory device. The memory device may fetch the commands, and begin execution of the fetched commands. Prior to completion of execution of the fetched commands, the memory device may post an interrupt, as discussed further below. Responsive to the posted interrupt, the host device sends the request to access the completion queue. In the event that the memory device has not, as yet, posted entries to the completion queue that indicates that the fetched commands have completed execution, the memory device may delay responding to the host device request.

Alternatively, or in addition, the controller of the memory device may determine to send the notice to the host device that an entry is posted to the completion queue, even before the entry has been posted. As discussed in more detail below, there is latency in the host device responding to an interrupt posted by the memory device. In particular, the memory device may determine an amount of time, such as a number of hardware processing cycles or a time in microseconds, that the host device typically takes in order to respond to the interrupt. With this knowledge of the host latency and with knowledge of when the memory device will post the entry to the completion queue, the memory device may transmit the interrupt early to the host device.

As discussed above, the completion queue may be resident in the CMB on the memory device or in host memory in the host device. In a first specific implementation with the completion queue resident in the CMB, the memory device may post the interrupt early to the host device. The memory device may time the sending of the interrupt based on the host latency (e.g., the time period from when the memory device post the interrupt to the time in which the host device request the read from the completion queue) and based on the memory device's estimate when the memory device posts the entry to the completion queue. For example, the memory device may determine a first time period, such as a number of processing cycles or a time in microseconds, when the memory device will complete processing of the command and a second time period, which may be represented by a number of processing cycles or a time in microseconds, for the host latency. In one implementation, the memory device may time the sending of the interrupt when the first time period equals the second time period. In other words, the memory device may time the sending of the interrupt when the time period for completing execution of the command equals the time period for the host device to respond to the interrupt. In a specific implementation, the time period for the host device to respond to the interrupt comprises a predetermined number of processing cycles. In this specific implementation, the memory device may then send the interrupt when the time period for completing execution of the command equals the predetermined number of processing cycles. In the event that the host device requests the read from the completion queue prior to the memory device posting the entry to the completion queue, the memory device may delay the response until after the entry is posted to the completion queue. In a second specific implementation with the completion queue resident in host memory, the memory device may likewise post the interrupt early to the host device. Similar to the first specific implementation, the memory device may time the sending of the interrupt based on the host latency and based on the memory device's estimate when the memory device posts the entry to the completion queue. However, because the completion queue is resident in the host device, the memory device is unable to delay the host device's request to read the entry from the completion queue. Nevertheless, in either implementation, the memory device may reduce the NVMe command life time.

EMBODIMENTS

The following embodiments describe non-volatile memory devices and related methods for processing of commands. Before turning to these and other embodiments, the following paragraphs provide a discussion of exemplary non-volatile memory devices and storage modules that can be used with these embodiments. Of course, these are just examples, and other suitable types of non-volatile memory devices and/or storage modules can be used.

FIG. 1A is a block diagram illustrating a non-volatile memory device 100. The non-volatile memory device 100 may include a controller 102 and non-volatile memory that may be made up of one or more non-volatile memory dies 104. As used herein, the term die refers to the set of non-volatile memory cells, and associated circuitry for managing the physical operation of those non-volatile memory cells, that are formed on a single semiconductor substrate. The controller 102 may interface with a host device or a host system and transmit command sequences for read, program, and erase operations to the non-volatile memory die(s) 104. As discussed below, the commands may include logical addresses.

The controller 102 (which may be a flash memory controller) can take the form of processing circuitry, a microprocessor or processor, and a computer-readable medium that stores computer-readable program code (e.g., software or firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a flash memory controller is a device that manages data stored on flash memory and communicates with a host, such as a computer or electronic device. A flash memory controller can have various functionality in addition to the specific functionality described herein. For example, the flash memory controller can format the flash memory to ensure the memory is operating properly, map out bad flash memory cells, and allocate spare cells to be substituted for future failed cells. Some part of the spare cells can be used to hold firmware to operate the flash memory controller and implement other features. One example of the firmware is a flash translation layer. In operation, when a host device needs to read data from or write data to the flash memory, it will communicate with the flash memory controller. In one embodiment, if the host device provides a logical address to which data is to be read/written, the flash memory controller can convert the logical address received from the host to a physical address in the flash memory. The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

The interface between the controller 102 and the non-volatile memory die(s) 104 may be any suitable flash interface, such as Toggle Mode 200, 400, or 800. In one embodiment, the memory device 100 may be a card based system, such as a secure digital (SD) or a micro secure digital (micro-SD) card. In an alternate embodiment, the non-volatile memory device 100 may be part of an embedded memory device.

Although in the example illustrated in FIG. 1A, the non-volatile memory device 100 may include a single channel between the controller 102 and the non-volatile memory die(s) 104, the subject matter described herein is not limited to having a single memory channel. For example, in some NAND memory device architectures, 2, 4, 8 or more NAND channels may exist between the controller and the NAND memory die(s) 104, depending on controller capabilities. In any of the embodiments described herein, more than a single channel may exist between the controller and the memory die(s) 104, even if a single channel is shown in the drawings.

Figure 1B:
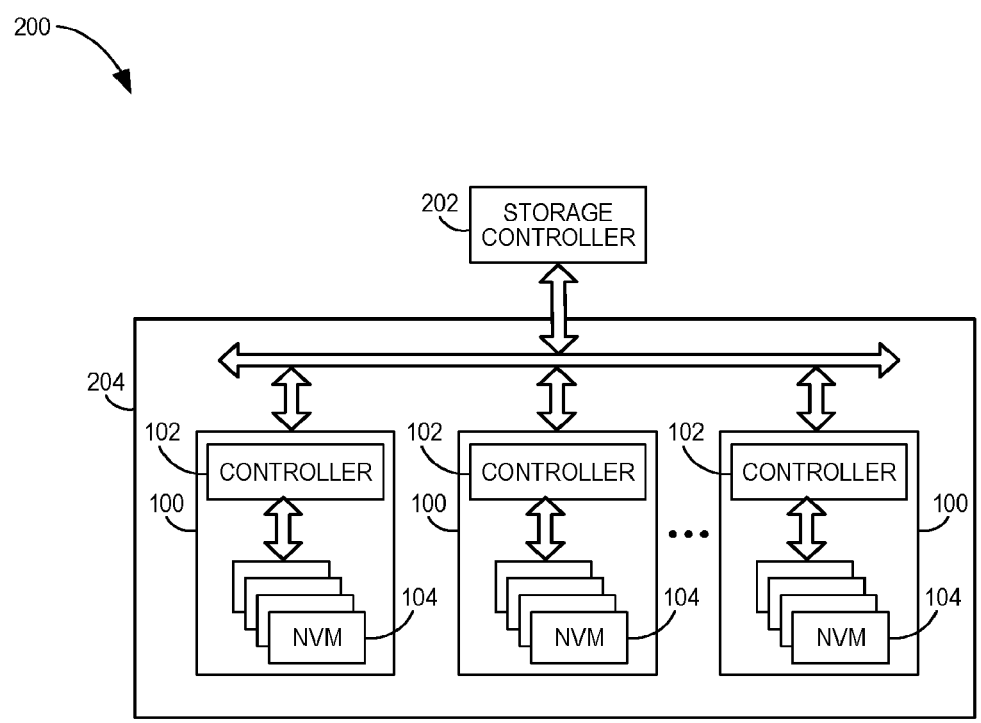
FIG. 1B is a block diagram of a storage module that includes a plurality of non-volatile memory systems and a host.

FIG. 1B illustrates a storage module 200 that includes plural non-volatile memory devices 100. As such, the storage module 200 may include a storage controller 202 that interfaces with a host 220 and with a storage system 204, which includes a plurality of non-volatile memory devices 100. The interface between the storage controller 202 and non-volatile memory devices 100 may be a bus interface, such as a serial advanced technology attachment (SATA), a peripheral component interface express (PCIe) interface, an embedded MultiMediaCard (eMMC) interface, a SD interface, or a Universal Serial Bus (USB) interface, as examples. The storage system 200, in one embodiment, may be a solid state drive (SSD), such as found in portable computing devices, such as laptop computers and tablet computers, and mobile phones.

Figure 1C:
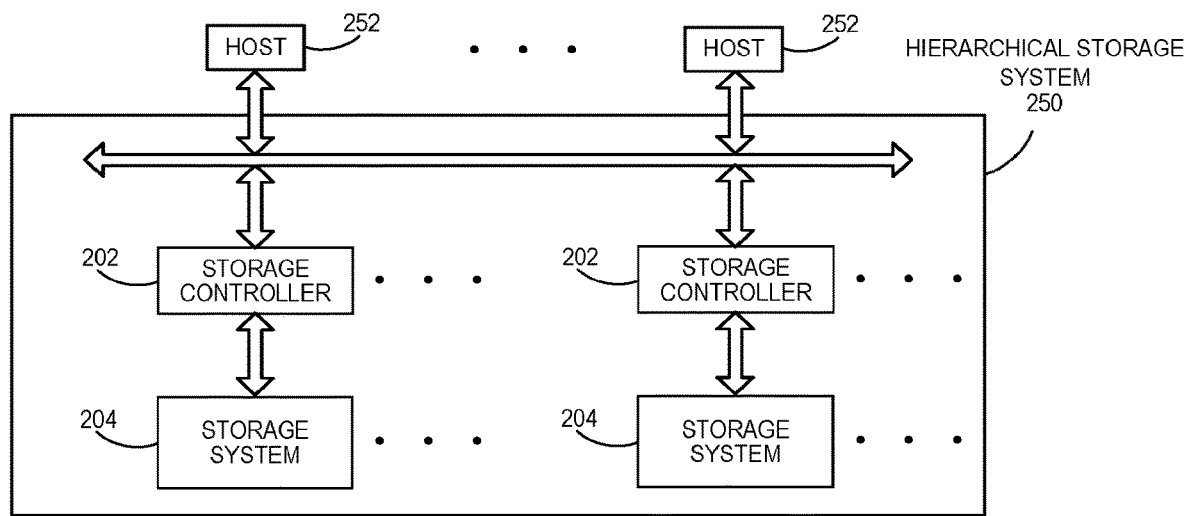
FIG. 1C is a block diagram of a hierarchical storage system.

FIG. 1C is a block diagram illustrating a hierarchical storage system 250. The hierarchical storage system 250 may include a plurality of storage controllers 202, each of which control a respective storage system 204. Host systems 252 may access memories within the hierarchical storage system 250 via a bus interface. Example bus interfaces may include a non-volatile memory express (NVMe), a fiber channel over Ethernet (FCoE) interface, an SD interface, a USB interface, a SATA interface, a PCIe interface, or an eMMC interface as examples. In one embodiment, the hierarchical storage system 250 illustrated in FIG. 1C may be a rack mountable mass storage system that is accessible by multiple host computers, such as would be found in a data center or other location where mass storage is needed. In one embodiment, host systems 252 may include the functionality described in host 220.

Figure 2A:
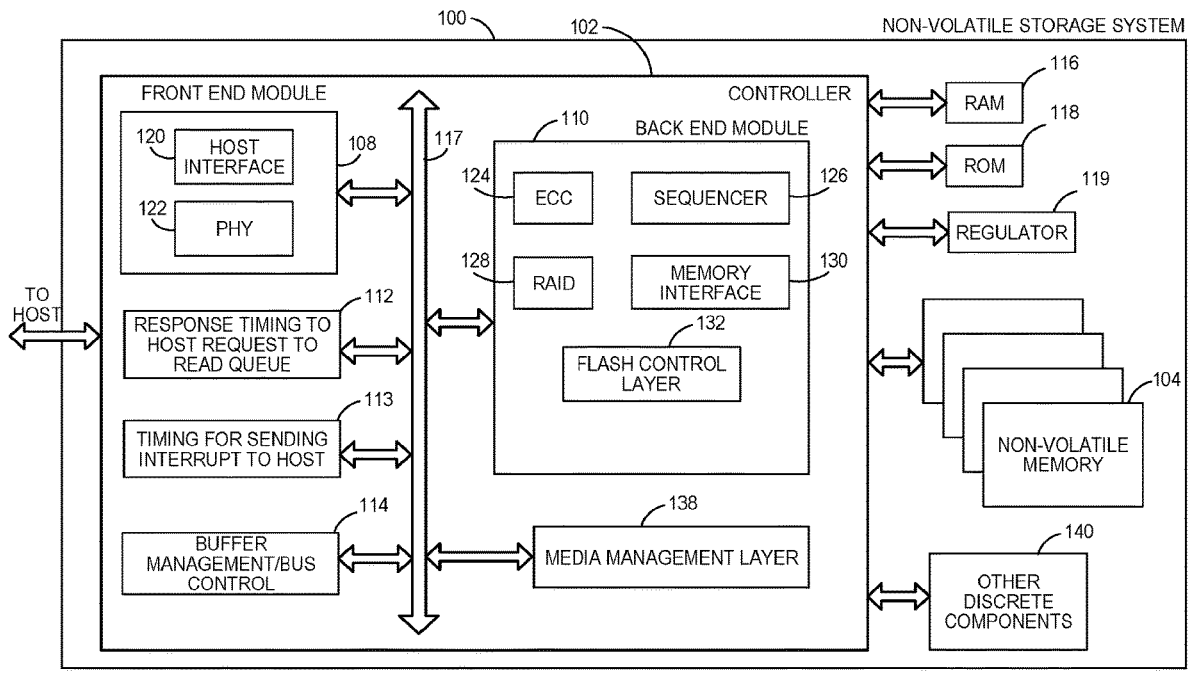
FIG. 2A is a block diagram of exemplary components of a controller of the non-volatile memory system of FIG. 1A.

FIG. 2A is a block diagram illustrating exemplary components of the controller 102 in more detail. The controller 102 may include a front end module 108 that interfaces with a host, a back end module 110 that interfaces with the non-volatile memory die(s) 104, and various other modules that perform various functions of the non-volatile memory device 100. In general, a module may be hardware or a combination of hardware and software. For example, each module may include an application specific integrated circuit (ASIC), a field programmable gate array (FPGA), a circuit, a digital logic circuit, an analog circuit, a combination of discrete circuits, gates, or any other type of hardware or combination thereof. In addition or alternatively, each module may include memory hardware that comprises instructions executable with a processor or processor circuitry to implement one or more of the features of the module. When any one of the module includes the portion of the memory that comprises instructions executable with the processor, the module may or may not include the processor. In some examples, each module may just be the portion of the memory that comprises instructions executable with the processor to implement the features of the corresponding module without the module including any other hardware. Because each module includes at least some hardware even when the included hardware comprises software, each module may be interchangeably referred to as a hardware module.

The controller 102 may include a buffer manager/bus control module 114 that manages buffers in random access memory (RAM) 116 and controls the internal bus arbitration for communication on an internal communications bus 117 of the controller 102. A read only memory (ROM) 118 may store and/or access system boot code. Although illustrated in FIG. 2A as located separately from the controller 102, in other embodiments one or both of the RAM 116 and the ROM 118 may be located within the controller 102. In yet other embodiments, portions of RAM 116 and ROM 118 may be located both within the controller 102 and outside the controller 102. Further, in some implementations, the controller 102, the RAM 116, and the ROM 118 may be located on separate semiconductor dies. As discussed below, in one implementation, the submission queues and the completion queues may be stored in the Controller Memory Buffer, which may be housed in RAM 116.

Additionally, the front end module 108 may include a host interface 120 and a physical layer interface (PHY) 122 that provide the electrical interface with the host or next level storage controller. The choice of the type of the host interface 120 can depend on the type of memory being used. Examples types of the host interface 120 may include, but are not limited to, SATA, SATA Express, SAS, Fibre Channel, USB, PCIe, and NVMe. The host interface 120 may typically facilitate transfer for data, control signals, and timing signals.

The back end module 110 may include an error correction controller (ECC) engine 124 that encodes the data bytes received from the host, and decodes and error corrects the data bytes read from the non-volatile memory die(s) 104. As discussed in more detail below, the ECC engine may be tunable, such as to generate different amounts of ECC data based on the mode (e.g., generate normal mode ECC data in normal programming mode and generate burst mode ECC data in burst programming mode, with the burst mode ECC data being greater than the normal mode ECC data). The back end module 110 may also include a command sequencer 126 that generates command sequences, such as program, read, and erase command sequences, to be transmitted to the non-volatile memory die(s) 104. Additionally, the back end module 110 may include a RAID (Redundant Array of Independent Drives) module 128 that manages generation of RAID parity and recovery of failed data. The RAID parity may be used as an additional level of integrity protection for the data being written into the non-volatile memory device 100. In some cases, the RAID module 128 may be a part of the ECC engine 124. A memory interface 130 provides the command sequences to the non-volatile memory die(s) 104 and receives status information from the non-volatile memory die(s) 104. Along with the command sequences and status information, data to be programmed into and read from the non-volatile memory die(s) 104 may be communicated through the memory interface 130. In one embodiment, the memory interface 130 may be a double data rate (DDR) interface, such as a Toggle Mode 200, 400, or 800 interface. A flash control layer 132 may control the overall operation of back end module 110.

Thus, the controller 102 may include one or more management tables for managing operations of storage system 100. One type of management table includes logical-to-physical address mapping table. The size of logical-to-physical address mapping table may grow with memory size. In this regard, the logical-to-physical address mapping table for high capacity storage device (e.g., greater than 32G) may be too large to store in SRAM, are may be stored in non-volatile memory 104 along with user and host data. Therefore, accesses to non-volatile memory 104 may first require reading the logical-to-physical address mapping table from non-volatile memory 104.

Additional modules of the non-volatile memory device 100 illustrated in FIG. 2A may include a media management layer 138, which performs wear leveling of memory cells of the non-volatile memory die 104. The non-volatile memory device 100 may also include other discrete components 140, such as external electrical interfaces, external RAM, resistors, capacitors, or other components that may interface with controller 102. In alternative embodiments, one or more of the RAID module 128, media management layer 138 and buffer management/bus controller 114 are optional components that may not be necessary in the controller 102.

Other modules of the non-volatile memory device 100 illustrated in FIG. 2A may include response timing to host request to read queue module 112 and timing for sending interrupt to host module 113. As discussed in more detail below, the memory device may use the response timing to host request to read queue module 112 to determine the timing of the response to a host request to read a queue (such as a completion queue), including delaying the response based on one or more actions that affect the queue (such as the completion queue being updated within a predetermined number of hardware cycles. The memory device may further use the timing for sending interrupt to host module 113 to determine the timing when to send an interrupt to the host device (such as sending the interrupt indicating that an entry is placed on the completion queue even before the memory device places the entry on the completion queue).

Figure 2B:
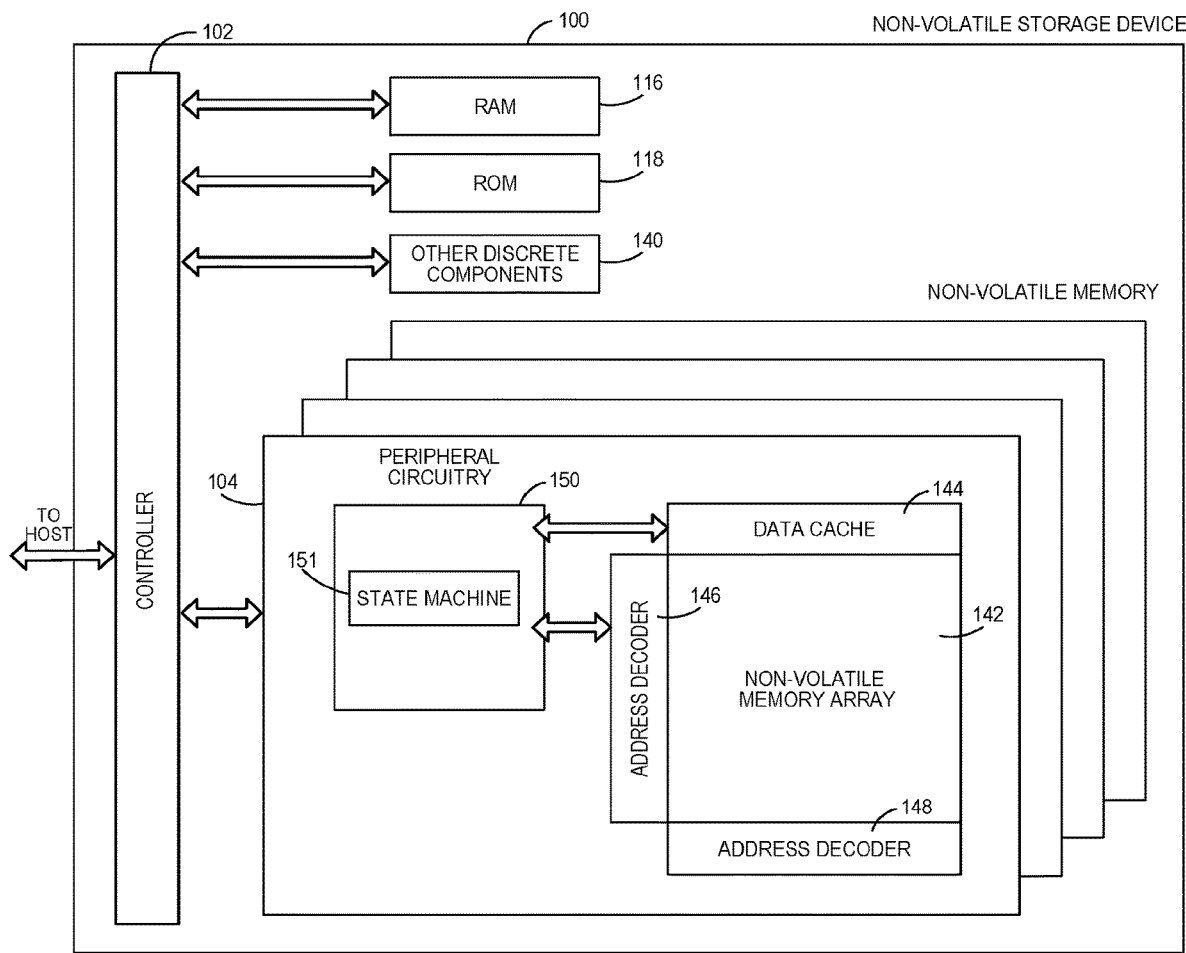
FIG. 2B is a block diagram of exemplary components of a non-volatile memory die of the non-volatile memory system of FIG. 1A.

FIG. 2B is a block diagram illustrating exemplary components of a non-volatile memory die 104 in more detail. The non-volatile memory die 104 may include a non-volatile memory array 142. The non-volatile memory array 142 may include a plurality of non-volatile memory elements or cells, each configured to store one or more bits of data. The non-volatile memory elements or cells may be any suitable non-volatile memory cells, including NAND flash memory cells and/or NOR flash memory cells in a two dimensional and/or three dimensional configuration. The memory cells may take the form of solid-state (e.g., flash) memory cells and can be one-time programmable, few-time programmable, or many-time programmable. In addition, the memory elements or cells may be configured as single-level cells (SLCs) that store a single bit of data per cell, multi-level cells (MLCs) that store multiple bits of data per cell, or combinations thereof. For some example configurations, the multi-level cells (MLCs) may include triple-level cells (TLCs) that store three bits of data per cell.

Additionally, a flash memory cell may include in the array 142 a floating gate transistor (FGT) that has a floating gate and a control gate. The floating gate is surrounded by an insulator or insulating material that helps retain charge in the floating gate. The presence or absence of charges inside the floating gate may cause a shift in a threshold voltage of the FGT, which is used to distinguish logic levels. That is, each FGT's threshold voltage may be indicative of the data stored in the memory cell. Hereafter, FGT, memory element and memory cell may be used interchangeably to refer to the same physical entity.

The memory cells may be disposed in the memory array 142 in accordance with a matrix-like structure of rows and columns of memory cells. At the intersection of a row and a column is a FGT (or memory cell). A column of FGTs may be referred to as a string. FGTs in a string or column may be electrically connected in series. A row of FGTs may be referred to as a page. Control gates of FGTs in a page or row may be electrically connected together.

The memory array 142 may also include wordlines and bitlines connected to the FGTs. Each page of FGTs is coupled to a wordline. In particular, each wordline may be coupled to the control gates of FGTs in a page. In addition, each string of FGTs may be coupled to a bitline. Further, a single string may span across multiple wordlines, and the number of FGTs in a string may be equal to the number of pages in a block.

The non-volatile memory die 104 may further include a page buffer or data cache 144 that caches data that is sensed from and/or that is to be programmed to the memory array 142. The non-volatile memory die 104 may also include a row address decoder 146 and a column address decoder 148. The row address decoder 146 may decode a row address and select a particular wordline in the memory array 142 when reading or writing data to/from the memory cells in the memory array 142. The column address decoder 148 may decode a column address to select a particular group of bitlines in the memory array 142 to be electrically coupled to the data cache 144.

In addition, the non-volatile memory die 104 may include peripheral circuitry 150. The peripheral circuitry 150 may include a state machine 151 that provides status information to the controller 102. Other functionality of the state machine 151 is described in further detail below.

Figure 3:
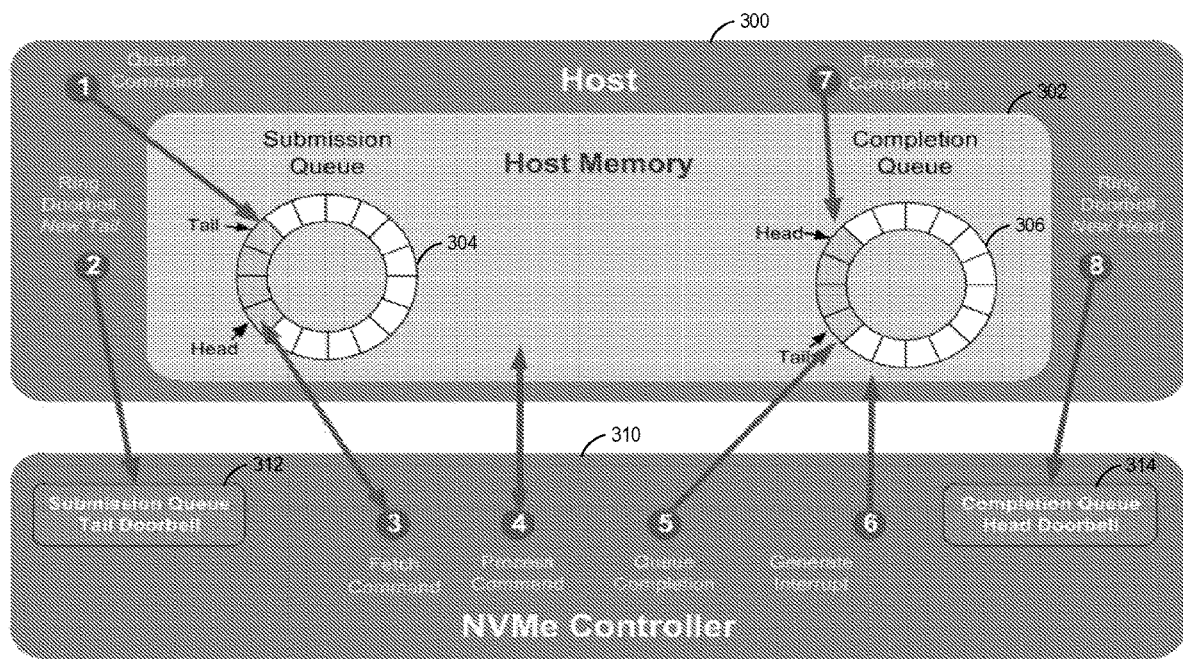
FIG. 3 is a block diagram of the host device and NVMe controller illustrating a sequence for a host device and a memory device to request and process an NVMe command.

FIG. 3 illustrates a sequence of steps for processing a command via the NVMe standard. As shown, the host device 300 includes host memory 302, and the memory device includes a controller, such as an NVMe controller 310. In one implementation, the host memory 302 includes a submission queue 304 and a completion queue 306. Further, in one implementation, the submission queues and completion queues may have a 1:1 correlation. Alternatively, the submission queues and completion queues do not have a 1:1 correlation.

In practice, at the initialization phase, the host device 300 creates one or more submission queues and one or more corresponding completion queues. In particular, the host device 300 may notify the memory device of the submission queue(s) and completion queue(s) by sending information, such as the base address for each queue to the memory device. In that regard, each submission queue has a corresponding completion queue. When the submission queue and the completion queue are resident in the host device, the host device sends information to the memory device in order for the memory device to determine the locations of the submission queue and the completion queue in the host device. In a specific implementation, the host device sends a command indicating the creation of the submission queue and the completion queue. The command may include a PRP1 pointer, which is a pointer to a list on the host device of the locations of the specific submission queue or the specific completion queue. In practice, the memory device sends a TLP read request using the PRP1 in order to obtain the PRP list, and stores the PRP list in the memory device to determine the memory locations within the host device for use in future commands to read from the specific submission queue or write to the specific completion queue. Alternatively, the host device 300 may instruct the memory device to create the submission queue(s) and corresponding completion queue(s) in a memory resident in the memory device, such as a controller memory buffer.

The submission queue 304 may be based on a ring buffer, such as illustrated in FIG. 3, with a head pointer and a tail pointer. After creating the submission queue(s) and notifying the memory device about the created submission queue(s), the host device 300 may write a command (or several commands) to the submission queue. This is indicated in FIG. 3 as step 1, labeled "Queue Command". In particular, FIG. 3 illustrates that four commands were written to the submission queue. In one implementation, the memory device is unaware that the host device 300 has updated the submission queue 304 with four commands, since the host device 300 updated its own host memory 302. In another implementation (such as when the submission queue(s) and completion queue(s) are resident in the controller memory buffer, the memory device may monitor a communication interface between the host device 300 and the memory device for particular communications, such as writing to the submission queue(s) resident on the memory device. For example, the memory device can monitor the transport layer packets (TLPs) on the PCI Express bus, to determine whether the host device 300 has sent a TLP that results in an update to the submission queue resident in the controller memory buffer. In that regard, the memory device may identify one or more entries being written to the submission queue(s).

In step 2, the host device 300 writes to a submission queue tail doorbell register 312 in the memory device. This writing to the submission queue tail doorbell register 312 signifies to the memory device that the host device queued one or more commands in this specific submission queue 304 (e.g., 4 commands as illustrated in FIG. 3). The writing to the submission queue tail doorbell register 312 may take one of several forms. In one way, the host device 300 indicates a new tail for the submission queue 304, thereby indicating the number of commands written to the submission queue 304. Thus, since the memory device is aware of the base address for the submission queue 304, the memory device only needs to know the tail address to indicate the number of new commands written to the submission queue 304. After a command (or a set of commands) is processed, the memory device then sets the new head of the submission queue 304 accordingly. So that, the tail pointer may represent an "offset" from the head pointer. In another way, the host device 300 indicates a number of commands written to the submission queue 304. In practice, each submission queue 304 has a corresponding submission queue tail doorbell register in the memory device, so that when the host device 300 updates a particular doorbell register (correlated to a particular submission queue 304), the memory device can determine, based on the doorbell register, which particular submission queue 304 has been updated.

After step 2 (whereby the memory device is notified of command(s) on the submission queue 304) and before step 3 (whereby the memory device fetches the command(s)), the memory device is aware that there are command(s) pending in the submission queue 304. In the general case, there may be several submission queues (with potentially many pending commands in the several submission queues). Thus, before performing step 3, the memory device controller may arbitrate between the various submission queues to select the particular submission queue from which to fetch the command(s).

Responsive to determining which particular submission queue 304 from which to fetch the command(s), at step 3, the memory device fetches the command(s) from the particular submission queue 304. In practice, the memory device may access the base address of the particular submission queue 304 plus the pointer on the current head pointer implemented in the host device 300.

As discussed above, the submission queue or completion queue may be assigned an area of memory (such as in the host device or in the controller memory buffer in the memory device). The submission queue and completion queues may include multiple entries, each associated with a specific command. The size of each entry may be a predetermined size, such as 64 Kb. In this regard, entries within the submission queue may be determined using the base address for the submission queue, and by offsetting the base address with the number of entries multiplied by the size of each entry (e.g., 64 Kb).

As discussed above, the memory device is aware of the tail pointer, having been notified via step 2. Thus, the memory device can obtain all of the new commands from the submission queue 304. In a submission queue resident on the host device, the memory device may send a TLP request to obtain the command(s) from the submission queue 304. Responsive to receipt of the TLP request, the host device 300 sends a completion TLP message with the commands in the submission queue 304. In this regard, at end of step 3, the memory device receives the command(s) from the submission queue 304.

At step 4, the memory device processes the command. In one implementation, the memory device parses the commands, and determines the steps to execute the commands (e.g., read/write/etc.). For example, the command may comprise a read command. Responsive to receipt of the read command, the memory device parses the read command, implements the address translation, and accesses the flash to receive the data. After receiving the data, the memory device causes the data to be stored on the host device based on information in the command (e.g., the PRP 1 discussed below). As another example, the command may comprise a write command. Responsive to receipt of the write command, the memory device parses the write command, determines the location of the data on the host device subject to the write, reads the data from the location on the host device, and writes the data to flash memory.

In particular, the memory device may receive a read command or write command with a PRP1 pointer. For example, a read command, in which the host device requests the memory device to read from the flash memory, includes a PRP1 pointer, which points to a PRP list. The memory device obtains the PRP list in order to determine the memory locations within the host device to write the data that was read from the flash memory. As another example, a write command, in which the host device requests the memory device to write data to the flash memory, includes a PRP1 pointer, which points to a PRP list. The memory device obtains the PRP list in order to determine the memory locations within the host device to read the data from (and thereafter save the read data to the flash memory).

Each entry in the PRP list may be associated with a certain section in the host device memory, and may be a predetermined size, such as 4 Kb. Thus, in a 1 Mb transfer, there may be 250 references in the PRP list, each 4 Kb in size. In practice, the memory device may retrieve data out of sequence. This may be due to the data subject to retrieval being on several flash dies, with the dies being available for data retrieval at different times. For example, the memory device may retrieve the data corresponding to 100-200 Kb of the 1 Mb transfer before retrieving the data corresponding to 0-100 Kb of the 1 Mb transfer. Nevertheless, because the memory device has the PRP list (and therefore knows the memory locations the host device expects the data corresponding to 100-200 Kb to be stored), the memory device may transfer the data corresponding to 100-200 Kb of the 1 Mb transfer without having first retrieved the data corresponding to 0-100 Kb of the 1 Mb transfer.

In NVMe, there may be a multitude of PCI Express TLPs to transfer the data from the memory device to the host device 300. Typically, the transferred data is stored in the host memory 302 of the host device 300 based on an indication in the command (e.g., the command includes an address to store the requested data.

After completing the data transfer, at step 5, the memory device controller sends a completion message to the relevant completion queue 306. As mentioned above, at the initialization phase, the host device 300 associates submission queues with completion queues. So that, the host device 300 is aware of commands that are completed in the submission queue based on which completion queue the memory device writes to. The completion message may contain information as to the processing of the command(s), such as whether the command was completed successfully or whether there was an error when executing the command.

After step 5, the host device 300 is unaware that the memory device posted to the completion queue 306. This is due to the memory device causing data to be written to the completion queue 306. In that regard, at step 6, the memory device notifies the host device 300 that there has been an update to the completion queue 306. In particular, the memory device posts an interrupt to the host device 300 (e.g., in NVMe, the host device 300 may use an MSIe interrupt). As discussed in more detail below, the memory device may time the sending of the interrupt prior to posting the entry to the completion queue.

Responsive to receiving the interrupt, the host device 300 determines that there are one or more completion entries pending for the host device 300 in this completion queue 306. At step 7, the host device 300 then processes the entries in the completion queue 306. For example, with a completion queue resident in the memory device, the host device may send a TLP read request to read the completion queue resident in the memory. As discussed in more detail below, the memory device may delay the response to the host device's read request.

After the host processes the entries from the completion queue 306, at step 8, the host device 300 notifies the memory device of the entries that the host device 300 processed from the completion queue 306. This may be performed by updating a completion queue head doorbell register 314 indicative to the memory device that the host device 300 processed one or more entries from the completion queue 306. When the Host issues completion queue doorbell write, the parameters of the relevant interrupt coalescing vector may be updated to reflect this change. For instance, the status of the completion queue may be changed from an almost full state to an almost empty state. As a result, an interrupt may be flushed to the host device.

Responsive to updating the completion queue head doorbell register 314, the memory device updates the head of the completion queue 306. Given the new head, the memory device is aware as to which entries in the completion queue 306 have already been processed by the host device 300 and may be overwritten.

Figure 4:
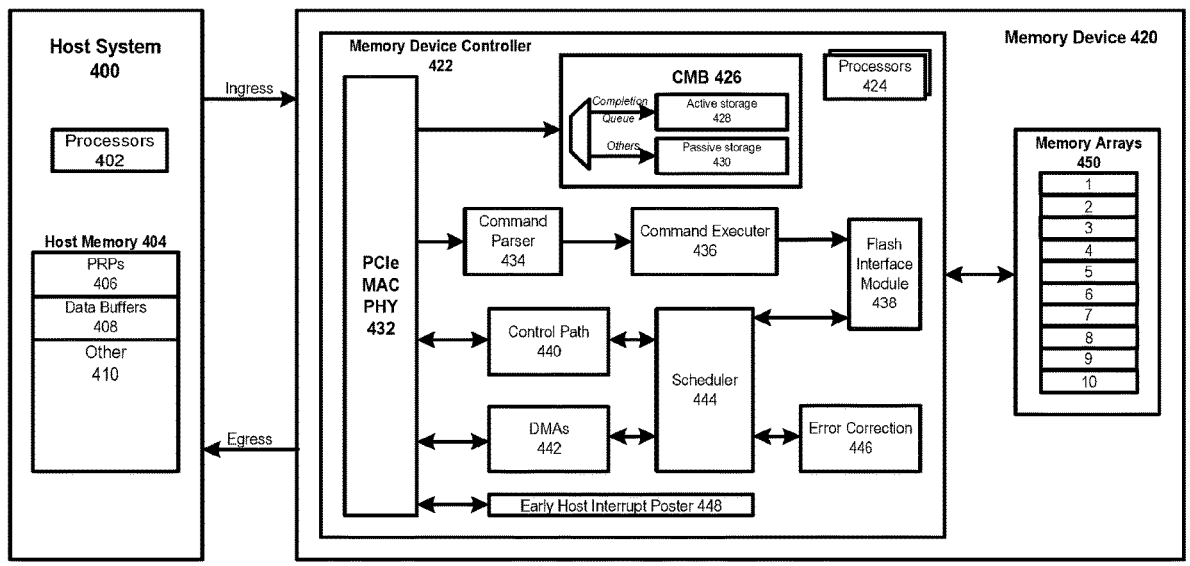
FIG. 4 is a block diagram of other exemplary components of a host system and a memory device.

FIG. 4 is a block diagram of other exemplary components of a host system 400 and a memory device 420. The host system 400 includes one or more processors 402 and host memory 404. Host memory 404 may comprise Physical Region Pages (PRPs) 406, data buffers 408, and other memory 410. Certain NVMe commands, such as read commands and write commands, may include a pointer to a PRP list, which defines a section in host device memory. For example, a read command may include a pointer to a PRP list, with the PRP list indicating the sections in memory where the memory device should store the data that was read responsive to the read command. As another example, a write command may include a pointer to a PRP list, with the PRP list indicating the sections in memory where the memory device should read the data that is for storage on the flash memory of the memory device. In processing the command, the memory device may obtain the PRP list by send one or more PRP fetching requests to the host device. In this regard, the memory device may send several PRP fetching requests, which are associated with different NVMe commands.

FIG. 4 further illustrates a communication interface between the host device 400 and the memory device 420. In a first implementation (not illustrated in FIG. 4), the communication interface between the host device and the memory device is simplex, with communications to and communications from the memory device on the same path. In a second implementation (illustrated in FIG. 4), the communication interface between the host device 400 and the memory device 420 is duplex, with a separate ingress path and a separate egress path. The ingress path, from the perspective of the memory device 420, includes incoming requests from the host device 400 to the memory device 420. Conversely, the egress path, from the perspective of the memory device 420, includes outgoing requests from the memory device 420 to the host device 400.

The incoming requests (requests from the host device 400 to the memory device 420) may be segmented in different ways, such as incoming read requests and incoming write requests. For example, the host device 400 may send, via the ingress path, a read request to read a section of memory in the memory device 420 (such as the controller memory buffer (CMB) 426, discussed below) or a write request to write to a section of memory in the memory device 420. Likewise, the memory device 420 may send, via the egress path, a read request to a section of memory in the host device 400 or a write request to write to a section of memory in the host device 400.

In practice using NVMe, there may be a series of read requests (a request by the host device to read a data resident on the memory device, and vice-versa) and a series of write requests (a request by the host device to write data to a location resident on the memory device, and vice-versa). In particular, in NVMe, the memory device and the host device communicate with one another using transaction layer packet (TLP) requests, such as TLP read requests to perform a read on the other device, or TLP write requests to perform a write on the other device. In one example (with the submission queue and the completion queue resident on the host device), responsive to a TLP write request (sent via the ingress path) by the host device to the doorbell register on the memory device (with the write to the doorbell register indicating that there is a command on the submission queue), the memory device uses a TLP read request (sent via the egress path) to fetch the write command from the submission queue (which is resident on the host device). Thus, the write command is a request for the memory device to write data to the non-volatile memory. The memory device then parses the write command for information, such as an indication of a PRP pointer (e.g., PRP1) to a PRP list. The PRP list is a series of information, such as pointers or addresses, that indicates the location of the data in the host device. The memory device then uses another TLP read request to read data from the pointers or address in the PRP list. Thereafter, the memory device performs the write by storing the data in non-volatile memory (e.g., flash memory) on the memory device. After storing the data, the memory device uses a TLP write request to write an entry to the completion queue (indicating that the write command has been completed). Finally, the memory device uses a TLP write request to generate an interrupt to the host device, with the interrupt signaling to the host device that there is an entry on the completion queue. Responsive to the interrupt, the host device reads the entry on the completion queue, and then issues a TLP write request to CQ Doorbell Write register indicating that the host device has reviewed the entry on the completion queue.

As another example (again with the submission queue and the completion queue resident on the host device), responsive to a TLP write request by the host to the doorbell register on the memory device (with the write to the doorbell register indicating that there is a command on the submission queue), the memory device uses a TLP read request to fetch the read command from the submission queue (which is resident on the host device). Thus, the read command is a request for the memory device to read data from the non-volatile memory and to send the read data to the host device. The memory device then reads the non-volatile memory (e.g., flash memory) to read the data. The memory device can perform a series of operations on the data, such as error correction, encryption/decryption, etc., with storage buffers interspersed between each of the serial operation. The memory device may then parse the read command for information, such as an indication of a PRP pointer (e.g., PRP1) to a PRP list. The PRP list is a series of information, such as pointers or addresses, that indicates the location in the host device to store the data that was read from non-volatile memory (and optionally error corrected, encrypted, etc.). The memory device uses a TLP read request to read data from the pointers or address in the PRP list. Thereafter, the memory device uses a TLP write request to write the data that was read from non-volatile memory. After writing the data to the host device, the memory device uses a TLP write request to write an entry to the completion queue (indicating that the read command has been completed). Finally, the memory device uses a TLP write request to generate an interrupt to the host device, with the interrupt signaling to the host device that there is an entry on the completion queue. Responsive to the interrupt, the host device reads the entry on the completion queue, and then issues a TLP write request to CQ Doorbell Write register indicating that the host device has reviewed the entry on the completion queue.

Optionally, the completion queue and submission queue may be resident in the memory device, such as in the Controller Memory Buffer (CMB) 426, part or all of which is allocated for host device 400. In that instance, the host device may send a TLP read request (sent via the ingress path) to the memory device to read from the completion queue. Likewise, the memory device may send a TLP write request (sent via the egress path) to generate an interrupt to the host device. For example, FIG. 4 illustrates that the completion queue is resident in active storage 428, whereas other data constructs are resident in passive storage 430. The processor(s) 424 may monitor some or all of the communications to the CMB. In one implementation, the processor(s) 424 may monitor communications related to the completion queue, such as a TLP read request. In response to the processor(s) 424 detecting a communication related to the completion queue, the processor(s) 424 may analyze the communication and act accordingly. For example, the processor(s) 424 may identify that the communication relates to reading the completion queue. In response to this determination, the processor(s) 424 may determine to delay the response based on other entries being added to the completion queue within a predetermined time period, as discussed in more detail below. In this regard, the storage 428 is active based on the active monitoring of communications (such as reads) directed to it. Conversely, storage 430 is passive based on the processor(s) 424 not monitoring communications direct to it.

In one implementation, when the host device 400 accesses the CMB, the memory device 420 first detects whether the access is to the completion queues zone or to other zones. For the other zones, a passive memory is implemented, such as SRAM and the host device 400 is able to issue read/write requests to this memory directly. For the completion queue zone, the memory device 420 implements an active logic which parses the transaction and respond in a different manner for each transaction, as explained more fully below.

Further, in one implementation, the host device allocates memory therein to the submission queues and completion queues, which may be physically located contiguously or non-contiguously. Alternatively, the host device 400 instructs the memory device 420 to allocate memory to the submission queue and the completion queue in the CMB 426.

Memory device 420 includes the memory device controller 422 and memory arrays 450. Memory array 450 may be segmented in various ways, such as in 10 sections as illustrated in FIG. 4. The memory device controller 422 may include one or more processors 424, incorporate one or all of a PCIe MAC and PHY interface 432, and incorporate and other HW and FW components.

Command parser 434 is configured to parse commands fetched from the submission queues (whether the submission queues are resident in the memory device 420 or in the host device 400). Command executer 436 is configured to arbitrate and execute the commands that were fetched and parsed from the submission queues. Scheduler 444 is configured to schedule one or more types of data transfers. As one example, read data may arrive via the flash interface module 438 from different memory arrays 450 in parallel. Scheduler 444 may arbitrate from amongst the different data transfers. As another example, scheduler 444 is responsible for controlling the data transfer while activating the control path 440 for fetching PRPs, posting completion and interrupts and activating the DMAs 442 for the actual data transfer between the host device 400 and the memory device 420.

Flash interface module 438 is configured to control and access the memory arrays 450. Memory device controller 422 further includes error correction 446, which may error correct the data fetched from the memory arrays 450 and which may include low-density parity-check (LDPC) which is a linear error correcting code. Other methods for error correction are contemplated.

Early host interrupt poster 448 is configured to post host device interrupts when enabled. As discussed in more detail below, early host interrupt poster 448 may post the interrupts to the host device 400 even before completing a command, considering PCIe and Host latency. In one implementation, the early posting time is adaptive and may depend on previous transaction latency. This previous transaction latency may be stored in the memory device and may be indicative of the latency of the host device to responding to the interrupt. In practice, the host device 400 will fetch the relevant completion queue entry just after the memory device 420 updates the completion queue with the entry.

Figure 5:
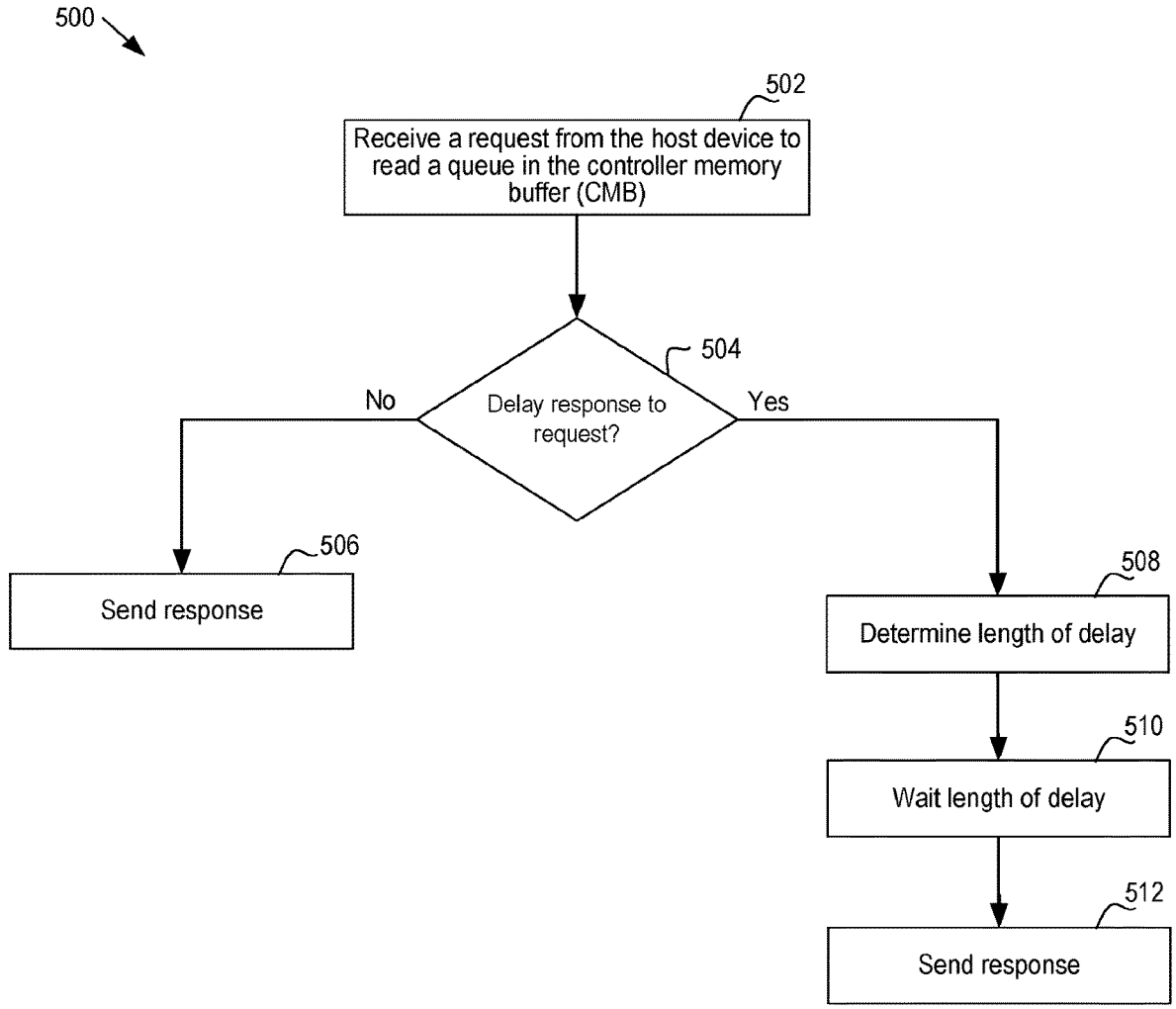
FIG. 5 is a flow chart of a first example method of determining whether to delay responding to a request from the host device to read the completion queue in the controller memory buffer.

FIG. 5 is a flow chart 500 of a first example method of determining whether to delay responding to a request from the host device to read the completion queue in the controller memory buffer. At 502, the memory device receives a request from the host device to read a queue (such as a completion queue) in the CMB. As discussed above, the memory device controller 422 may monitor communications to various sections of memory, such as the CMB, to determine whether the communication relates to a queue, such as the completion queue. At 504, the memory device determines whether to delay the response to the request. As discussed above, the memory device may determine, based on various operations detected, to delay the response to the request to read the queue. One example comprises an operation affecting the queue, such as anticipated future activity (e.g., posting an entry to the completion queue) within a predetermined time period (e.g., predetermined number of hardware cycles). If at 504, it is not determined to delay the response, at 506, the memory device sends the response. If at 504, it is determined to delay the response, at 508, the memory device may determine the length of the delay (e.g., the estimate time when the entry will be posted to the completion queue), at 510, wait the length of the delay, and at 512, send the response. Alternatively, instead of triggering the sending of the response based on the elapsed time, the memory device may trigger the sending of the response based on a detection of an event. For example, the memory device may determine to wait until the memory device detects that the posting of the entry to the completion queue. In response to the determination, the memory device may then respond to the host device query to read the completion queue.

Figure 6:
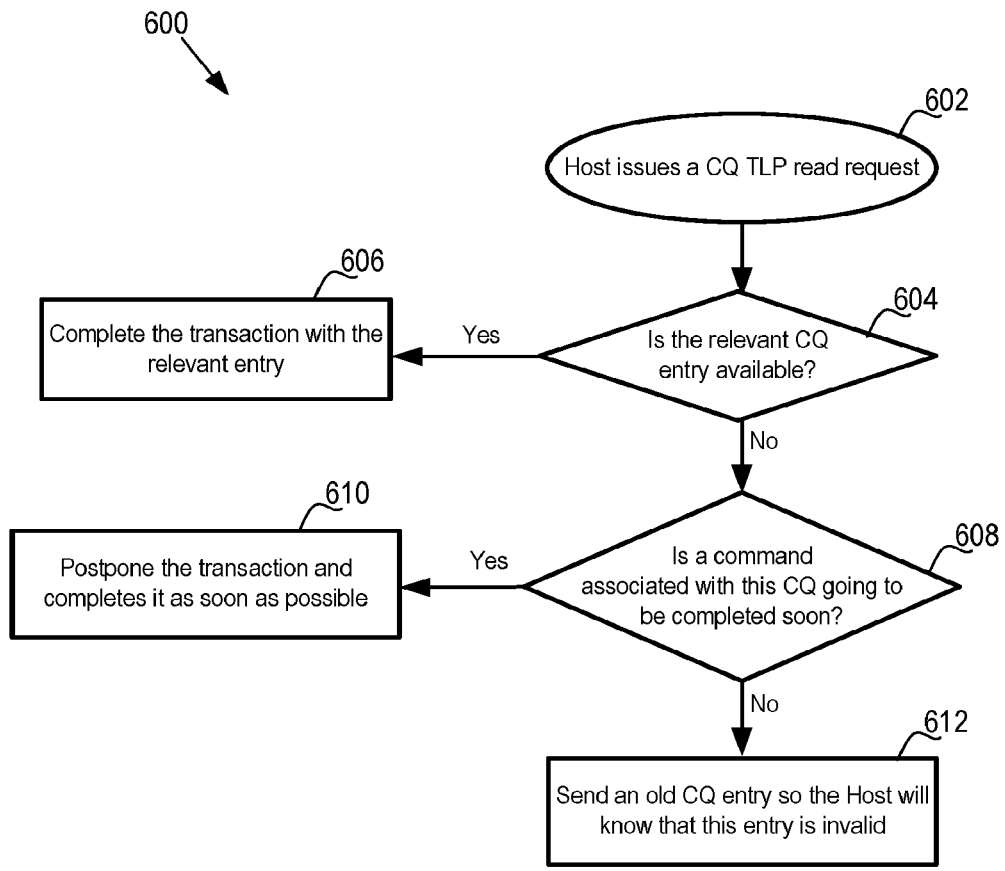
FIG. 6 is a flow chart of a second example method of determining whether to delay responding to a request from the host device to read the completion queue in the controller memory buffer.

FIG. 6 is a flow chart 600 of a second example method of determining whether to delay responding to a request from the host device to read the completion queue in the controller memory buffer. At 602, the host device issues a completion queue TLP read request trying to access a completion queue entry when the completion queue is resident in the CMB. At 604, the memory device determines whether the relevant completion queue entry is available and stored internally to the memory device. If the relevant completion queue is available and stored internally, at 606, the memory device may complete the transaction immediately by providing the required entry to the host device. Otherwise, at 608, the memory device checks if there is a command associated with this completion queue that is going to be completed soon (e.g., within a predetermined number of hardware cycles so as not to cause a timeout error). If so, at 610, the memory device postpones the transaction and completes it as soon as the entry is available. Otherwise, at 612, the memory device completes the transaction right away while providing an entry that the host device will understand that the entry provided is invalid.

Figure 7:
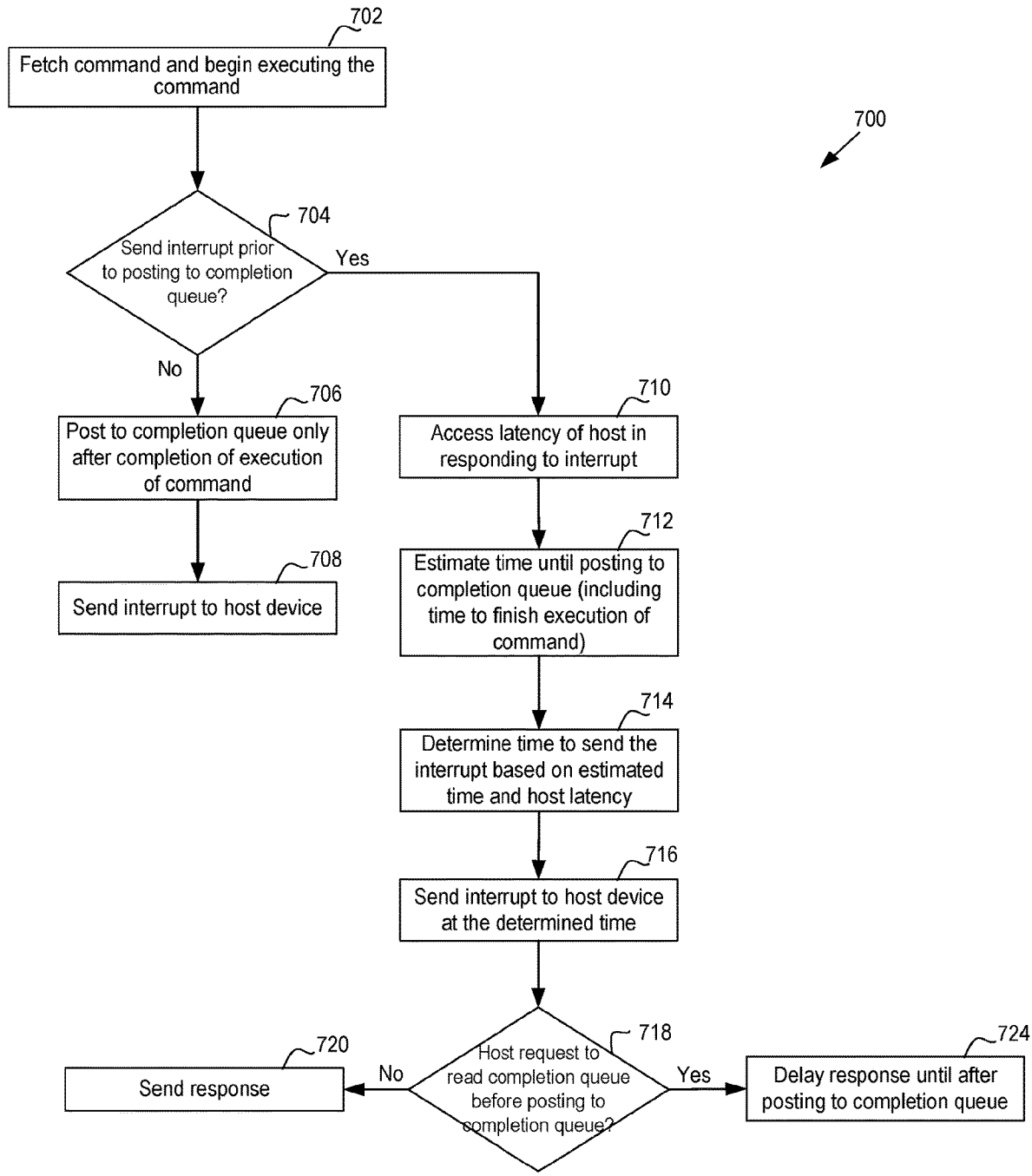
FIG. 7 is a flow chart of an example method of determining whether to send the interrupt to the host device prior to posting to the completion queue.

FIG. 7 is a flow chart 700 of an example method of determining whether to send the interrupt to the host device prior to posting to the completion queue. At 702, the memory device fetches the command and begins executing the command. At 704, the memory device determines whether to send the interrupt prior to posting to the completion queue. Alternatively, the memory device may determine to send the interrupt prior to completing execution of the command. For example, in a write request, the memory device may determine to post the interrupt before completing the writing of the data to flash memory on the memory device. If not, at 706, the memory device posts to the completion queue only after completion of execution of the command. After which, at 708, the memory device send the interrupt to the host device.

If the memory device determines to send the interrupt prior to posting the completion queue or completion of execution, at 710, the memory device may access latency of the host device in responding to the interrupt. The memory device may record the timing of the host device in responding to previous interrupts in order to determine the host latency (e.g., how long it takes for the host device to respond to the interrupt and how long it takes for the host device to send a TLP read request to the completion queue). At 712, the memory device further estimates the time until posting to the completion queue (including the time to finish execution of the command). Based on the host latency and the estimated time to posting to the completion queue, at 714, the memory device determines the time to send the interrupt. At 716, the memory device sends the interrupt at the determined time.

At 718, the memory device determines whether the host device TLP read request to read the completion queue has arrived prior to the memory device posting the entry to the completion queue. If not, at 720, the memory device sends the response immediately (including the entry read from the completion queue). If so, the memory device did not estimate correctly and the host device sent the read request sooner than expected. In this case, at 724, the memory device delays the response to the read request until after the memory device posts the entry to the completion queue. In the event that the memory device estimate is significantly in error such that the delay is greater than the timeout error, the memory device may send an old entry from the completion queue to indicate to the host device that the old entry sent is invalid.

Figure 8:
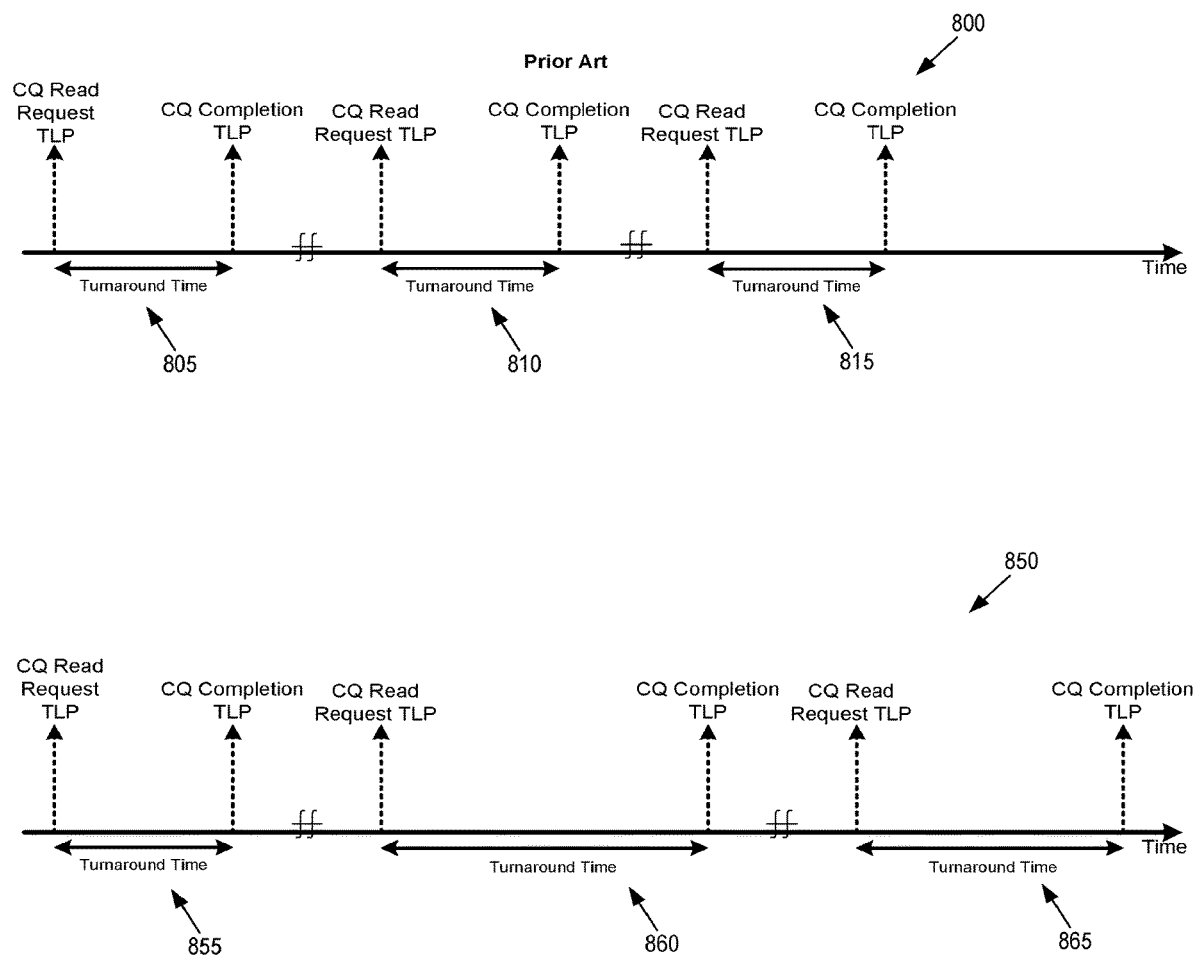
FIG. 8 is a timing diagram showing differences between the prior art and one implementation for a host device access to a completion queue stored in the controller memory buffer.

FIG. 8 is a timing diagram showing differences between the prior art timing diagram 800 and one implemented timing diagram 850 for a host device access to a completion queue stored in the controller memory buffer. In the prior art implementation, the controller in the memory device manages the CMB in a passive manner, in which requests to access the CMB to read a completion queue therein are processed as ordinary commands without consideration for any other activity related to the CMB (or to the completion queue therein). In this regard, the memory device in the prior art implementation posts to the completion queues in the CMB and the host device fetches entries from the CMB. As a result, on PCIe, the time period from the completion queue (CQ) read request TLP to its CQ completion TLP (which is the TLP the memory device sends in response back to the host reporting the entry from the completion queue) is relatively fixed and equals to PCIe turnaround time. This is illustrated in FIG. 8 as the "turnaround time" 805, 810, 815 being the same across different CQ read requests TLPs.

Conversely, in one implementation, the controller in the memory device may actively manage the CMB, and under certain circumstances, postpone the transactions (e.g., the CQ completion TLP), causing an adaptive delay. As discussed above, the memory device may delay the response based on activity in the CMB, such as the memory device determining that the completion queue subject to the TLP read request will have posted therein an entry within a predetermined period of time. Thus, as shown in FIG. 8, turnaround time 855 is not subject to delay and is the same as turnaround times 805, 810, and 815. However, turnaround times 860 and 865 are different from turnaround times 805, 810, and 815. In particular, turnaround times 860 and 865 are a longer time period than turnaround times 805, 810, and 815, and illustrate the memory device's delay in the response. Thus, the turnaround times 860 and 865 represent the time period in which the memory device completes activity on the completion queue (such as posting a new entry to the completion queue) and sending the CQ completion TLP. Though the turnaround time 860 and 865 are longer than turnaround times 805, 810, and 815, the overall efficiency of communications between the host device and the memory device may be improved.

Figure 9:
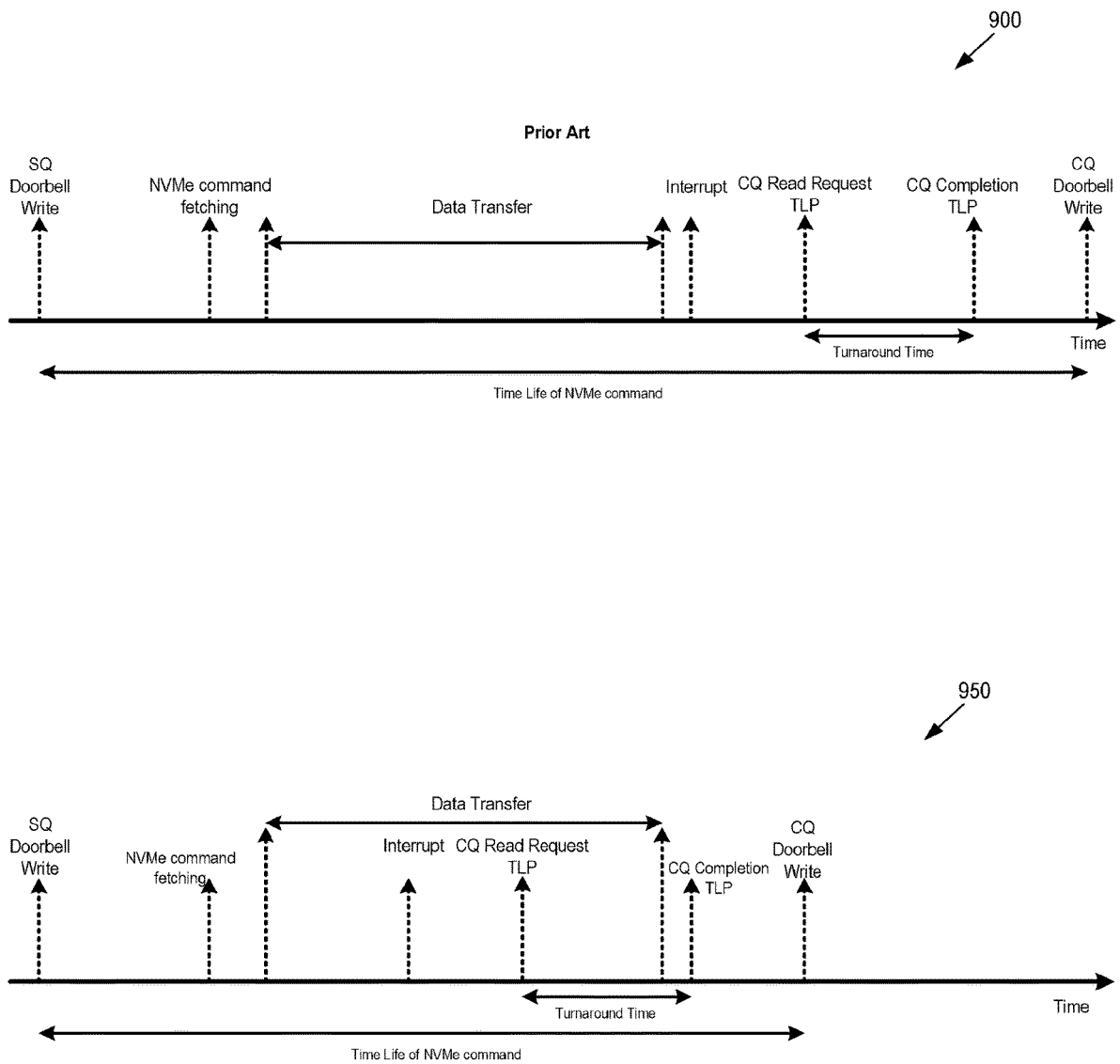
FIG. 9 is a timing diagram showing differences between the prior art posting to the completion queue and one implementation of early interrupt posting for a completion queue stored in the controller memory buffer.

FIG. 9 is a timing diagram showing differences between the prior art timing diagram 900 and one implemented timing diagram 950 of early interrupt posting for a completion queue stored in the controller memory buffer. As shown in FIG. 9, the timing is measured from the host device sequential queue (SQ) doorbell write (with the host indicating that there is a command on the sequential queue) to the host device completion queue (CQ) doorbell write (with the host indicating that it has retrieved the entry from the completion queue). In operation of the prior art timing diagram 900, after receiving an SQ doorbell write, the memory device fetches the command from the submission queue and initiates the data transfer. After completing the data transfer, the memory device writes the entry to the completion queue in the CMB and posts the interrupt. Thereafter, the host device fetches the relevant CQ entry (using the CQ read request TLP, receives the response (in the form of the CQ completion TLP), and finally sends a CQ doorbell write (indicating that the host device read the entry on the completion queue).

As shown in FIG. 9, the SQ doorbell write, the NVMe command fetching (in which the memory device fetches the command from the sequential queue), and the beginning of the data transfer is the same timing for 900 and 950. In contrast, in the prior art timing diagram 900, the memory device issues the interrupt to the host device only after the data transfer has been completed (e.g., in a read command, the memory device has written all of the data that was read from flash memory to the host device) and the entry is posted to the completion queue. In the implemented timing diagram 950, the interrupt is sent to the host device even before the data transfer is completed. Responsive to the interrupt, the host device sends the CQ read request TLP, in effect a request to the memory device to read the completion queue resident in the CMB. Thus, the interrupt is posted earlier, even before completing the data transfer. In this implementation, the memory device may determine the precise time for posting the interrupt. In a specific implementation, the memory device may determining the timing adaptively. For example, a preferred timing is when the internal logic of the memory device receives the CQ read request TLP and accounting for the turnaround time (in terms of the memory device servicing the CQ read request TLP), the relevant entry is already available and stored to the completion queue. In this regard, the memory device may issue the CQ completion TLP (with the relevant entry read from the completion queue). After which, the host device may issue a CQ doorbell write, ending the timing sequence. As can be shown below the NVMe command life time is shorten compared to the prior art.

Thus, the memory device may send early notification to the host device (in the form of the interrupt) about a completion queue entry availability by considering the host device latency in processing the interrupt and the PCIe latency in the communications. As shown in FIG. 9, the NVMe command timeline is significantly shortened, directly result in an increase in performance, particularly when having low queue depth. In one implementation, the early notification time of the interrupt is adaptive and may depend on one or more aspects, such as the memory device queue depth, past measured latency and configuration. With regard to queue depth, posting an early interrupt that is synchronized with the host device fetching of the relevant completion queue entry is relevant, particularly in low queue depth configurations (e.g., 1 or 2 commands processed at a time). For example, in queue depth of one, the host device sends the next command only after receiving the completion indication of the previous command. The present methodology causes the host device to obtain that completion entry earlier, thereby improving performance. As another example, accurate timing in high queue depth is less important since the bandwidth would likely be the same. Nevertheless, latency is improved.

With regard to latency, previous measurements of host device interrupt latency may change the timing when the memory device sends the early interrupt. These measurements may be on a completion queue basis (e.g., measure latency for one, some, or each completion queue separately) since different completion queues may be assigned to different host device CPUs, with each CPU potentially having a different latency. In addition, the latency may depend on the status of the associated completion queue. For example, a completion queue may have a status of empty (no completion queue entries), almost empty, almost full and full. In particular, when a respective completion queue is full, the memory device may adjust the timing so the host device will obtain the entry as soon as possible since the host device is in idle state during this time. With regard to configuration, the firmware may analyze the response based on the present adaptive methodology. In one implementation, the firmware may disable the adaptive methodology based on the analysis. In an alternate implementation, the firmware may apply the adaptive methodology to certain aspects of the NVMe protocol, and not apply the adaptive methodology to other aspects of the NVMe protocol.

In the event that the memory device sends the interrupt too early resulting in the host device sending the CQ read request TLP prior to the entry being posted to the completion queue, the memory device may still process the CQ read request TLP. In particular, since the completion queue is located in CMB, the memory device may delay the response to the CQ read request TLP, with the response being sent as soon as the completion entry is available. Further, in the event that there is any error during the data transfer after the memory device sends the interrupt, the memory device may simply update the host device using the completion queue entry that will be provided after completing the data transfer.

Figure 10:
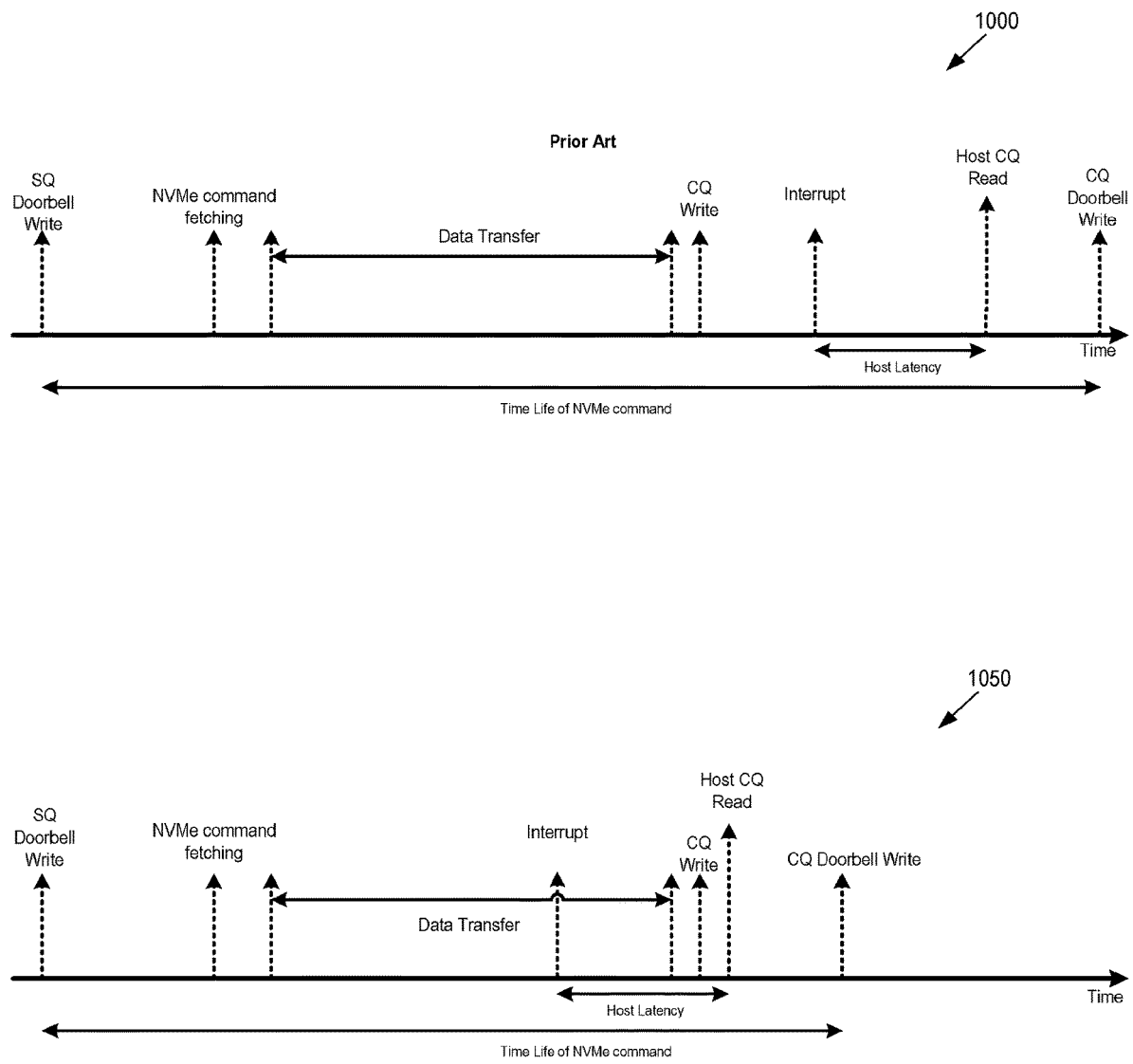
FIG. 10 is a timing diagram showing differences between the prior art posting to the completion queue and one implementation of early interrupt posting for a completion queue stored in the host device.

FIG. 10 is a timing diagram showing differences between the prior art timing diagram 1000 and one implemented timing diagram 1050 of early interrupt posting for a completion queue stored in the host device. In contrast to FIG. 9, the sequential queue and the completion queue are resident in the host device. Thus, host device completion queue accesses cannot be monitored on PCIe bus connected to the memory device; however, the memory device may monitor all other transactions, including the SQ doorbell write, NVMe command fetching, data transfer, CQ entry write, interrupt posting and CQ doorbell write, As shown in FIG. 10, the timing is measured from the host device sequential queue (SQ) doorbell write (with the host indicating that there is a command on the sequential queue) to the host device completion queue (CQ) doorbell write (with the host indicating that it has retrieved the entry from the completion queue). In operation of the prior art timing diagram 1000, after receiving an SQ doorbell write, the memory device fetches the command from the submission queue and initiates the data transfer. After completing the data transfer, the memory device writes the entry to the completion queue in the host device and posts the interrupt. In response to the interrupt, the host device reads the entry on the completion queue resident in the host device (shown as host latency). Thereafter, the host device performs a CQ doorbell write (indicating that the host device read the entry on the completion queue). In this regard, the transactions performed by the memory device are executed one by one with no parallelism.

As shown in FIG. 10, the SQ doorbell write, the NVMe command fetching (in which the memory device fetches the command from the sequential queue), and the beginning of the data transfer is the same timing for 1000 and 1050. In contrast, in the prior art timing diagram 1000, the memory device issues the interrupt to the host device only after the data transfer has been completed (e.g., in a read command, the memory device has written all of the data that was read from flash memory to the host device) and the entry is posted to the completion queue (CQ write). In the implemented timing diagram 1050, the interrupt is sent to the host device even before the data transfer is completed and before the entry is posted to the completion queue. In response to the interrupt, the host device reads the entry on the completion queue resident in the host device (shown as host latency). Because the completion queue is resident on the host device, the memory device cannot delay the response, such as may be potentially done in FIG. 9. In this regard, the memory device times the sending of the interrupt so that the entry is posted to the completion queue (CQ write) prior to the host device reads the CQ (host CQ read). After which, the host device performs a CQ doorbell write. As shown, the time life of the NVMe command for diagram 1050 is shorter than the time life of the NVMe command for diagram 1000. Thus, the memory device posts the interrupt early so the relevant Host CQ fetching is performed just after the memory device updates the entry on the completion queue.

Lastly, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

The invention claimed is:

1. A method comprising:
   in a memory device:
   receiving a command from a host device to execute a host command;
   in response to receiving the command, executing the host command;
   accessing an indication of latency of the host device responding to an interrupt, the interrupt indicative to the host device to access one or more entries to a completion queue, the one or more entries indicative of completion of execution of one or more host commands; and
   sending, prior to the memory device completing execution of the host command and based on the latency of the host device responding to the interrupt, the interrupt to the host device.

2. The method of claim 1, wherein the completion queue is resident on the memory device.

3. The method of claim 2, further comprising:
   responsive to sending the interrupt, receiving a request from the host device to access the completion queue; and
   responsive to the request, delaying responding to the request until the completion queue is updated.

4. The method of claim 1, wherein the completion queue is resident on the host device.

5. The method of claim 1, further comprising determining the latency of the host device responding to the interrupt.

6. The method of claim 1, further comprising, after sending the interrupt to the host device, updating the completion queue with an entry indicating completion of execution of the host command.

* * * * *